(12) United States Patent
Moravek et al.

(10) Patent No.: US 9,884,690 B2
(45) Date of Patent: Feb. 6, 2018

(54) METHODS AND SYSTEMS FOR CONVEYING DESTINATION VIABILITY

(71) Applicant: HONEYWELL INTERNATIONAL INC., Morris Plains, NJ (US)

(72) Inventors: Zdenek Moravek, Rozdrojovice (CZ); Katerina Sprinarova, Hradec Králové (CZ); David Kunes, Tisnov (CZ); Filip Magula, Albrechtice (CZ)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 15/145,346

(22) Filed: May 3, 2016

(65) Prior Publication Data

US 2017/0320589 A1 Nov. 9, 2017

(51) Int. Cl.
*G06F 19/00* (2011.01)
*B64D 45/00* (2006.01)
*G08G 5/02* (2006.01)

(52) U.S. Cl.
CPC ............. *B64D 45/00* (2013.01); *G08G 5/025* (2013.01)

(58) Field of Classification Search
USPC ........................................................ 701/16
See application file for complete search history.

(56) References Cited

U.S. PATENT DOCUMENTS

| | | | |
|---|---|---|---|
| 5,398,186 A | 3/1995 | Nakhla | |
| 5,842,142 A | 11/1998 | Murray et al. | |
| 6,199,008 B1 | 3/2001 | Aratow et al. | |
| 6,542,796 B1 | 4/2003 | Gibbs et al. | |
| 7,342,514 B1 | 3/2008 | Bailey et al. | |
| 7,499,771 B2 | 3/2009 | Caillaud | |
| 7,796,055 B2 | 9/2010 | Clark et al. | |
| 7,908,078 B2 | 3/2011 | He | |
| 7,963,618 B2 | 6/2011 | Stone et al. | |
| 8,010,242 B1 | 8/2011 | Ginsberg et al. | |
| 8,026,831 B2 | 9/2011 | Muramatsu et al. | |

(Continued)

FOREIGN PATENT DOCUMENTS

| EP | 2317488 A2 | 5/2011 |
|---|---|---|
| EP | 2355071 A1 | 8/2011 |

(Continued)

OTHER PUBLICATIONS

Haroon, K; FMC Alternate Airport and Diversion; The Airline Pilots Forum & Resource, 2012.

(Continued)

*Primary Examiner* — Tyler Paige
(74) *Attorney, Agent, or Firm* — Lorenz & Kopf, LLP

(57) ABSTRACT

Methods and systems are provided for facilitating analysis and selection of a destination for operating a vehicle. One exemplary method facilitating analysis of landing an aircraft at an airport involves displaying a map of the airport that includes a graphical representation of a runway at the airport, determining a runway viability parameter for the runway using current status information associated with one or more of the aircraft and the airport, and displaying indicia of the runway viability parameter on the map in graphical association with the graphical representation of the runway, thereby providing indication of the value or state of the runway viability parameter for that runway on the airport map.

20 Claims, 7 Drawing Sheets

(56) References Cited

U.S. PATENT DOCUMENTS

| | | | |
|---|---|---|---|
| 8,112,186 | B2 | 2/2012 | Sylvester |
| 8,200,378 | B1 | 6/2012 | Chiew et al. |
| 8,214,136 | B2 | 7/2012 | Caillaud |
| 8,292,234 | B2 | 10/2012 | Shuster |
| 8,521,343 | B2 | 8/2013 | Spinelli |
| 8,554,457 | B2 | 10/2013 | White et al. |
| 8,565,944 | B1 * | 10/2013 | Gershzohn ........... G08G 5/0039 701/1 |
| 8,612,070 | B2 | 12/2013 | Geoffrey et al. |
| 8,666,649 | B2 | 3/2014 | Otto et al. |
| 8,676,481 | B2 | 3/2014 | Coulmeau et al. |
| 8,849,478 | B2 | 9/2014 | Coulmeau et al. |
| 9,047,769 | B2 | 6/2015 | Lafon et al. |
| 9,064,407 | B2 | 6/2015 | Otto et al. |
| 9,098,996 | B2 | 8/2015 | Barraci et al. |
| 9,310,222 | B1 * | 4/2016 | Suiter ................... G01C 23/005 |
| 2004/0030465 | A1 | 2/2004 | Conner et al. |
| 2005/0049762 | A1 | 3/2005 | Dwyer |
| 2008/0300737 | A1 | 12/2008 | Sacle et al. |
| 2009/0150012 | A1 * | 6/2009 | Agam ................... G08G 5/0034 701/3 |
| 2009/0171560 | A1 | 7/2009 | McFerran et al. |
| 2010/0161156 | A1 * | 6/2010 | Coulmeau ............ G08G 5/0021 701/3 |
| 2010/0198433 | A1 | 8/2010 | Fortier et al. |
| 2011/0264312 | A1 | 10/2011 | Spinelli et al. |
| 2012/0218127 | A1 | 8/2012 | Kroen |
| 2012/0245836 | A1 * | 9/2012 | White ....................... G08G 5/06 701/120 |
| 2013/0001355 | A1 | 1/2013 | Cox et al. |
| 2013/0046422 | A1 | 2/2013 | Cabos |
| 2013/0090842 | A1 | 4/2013 | Stabile |
| 2013/0179011 | A1 | 7/2013 | Colby et al. |
| 2013/0179059 | A1 | 7/2013 | Otto et al. |
| 2013/0304349 | A1 | 11/2013 | Davidson |
| 2014/0278056 | A1 | 9/2014 | Williams et al. |
| 2014/0309821 | A1 * | 10/2014 | Poux ................... G08G 5/0021 701/14 |
| 2014/0343765 | A1 * | 11/2014 | Suiter ................... G08G 5/0056 701/18 |
| 2014/0350753 | A1 | 11/2014 | Depape et al. |
| 2015/0015421 | A1 | 1/2015 | Kriger et al. |
| 2015/0081197 | A1 | 3/2015 | Gaertner et al. |
| 2015/0241295 | A1 | 8/2015 | Fuscone et al. |
| 2015/0279218 | A1 | 10/2015 | Irrgang et al. |
| 2015/0371544 | A1 | 12/2015 | Mere |
| 2016/0229554 | A1 * | 8/2016 | Kawalkar ............ G01C 23/005 |

FOREIGN PATENT DOCUMENTS

| | | |
|---|---|---|
| EP | 1963888 B1 | 1/2013 |
| EP | 2574965 A2 | 4/2013 |
| EP | 2657922 | 10/2013 |
| EP | 2657923 | 10/2013 |
| EP | 2790168 A2 | 10/2014 |
| EP | 2980774 A1 | 2/2016 |
| WO | 2007006310 A2 | 1/2007 |
| WO | 2013162524 A1 | 10/2013 |

OTHER PUBLICATIONS

Atkins, E.M. et al.; Emergency Flight Planning Applied to Total Loss of Thrust; Journal of Aircraft vol. 43, No. 4, Jul.-Aug. 2006.

Moravek, Z. et al.; Methods and Systems Facilitating Holding for an Unavailable Destination; Filed on Feb. 9, 2016 and assigned U.S. Appl. No. 15/019,675.

Moravek, Z. et al.; Methods and Systems for Safe Landing at a Diversion Airport; Filed on Feb. 9, 2016 and assigned U.S. Appl. No. 15/019,650.

Moravek, Z. et al.; Methods and Systems for Presenting Diversion Destinations; Filed on Nov. 30, 2015 and assigned U.S. Appl. No. 14/953,635.

Moravek, Z. et al.; Methods and Systems Facilitating Stabilized Descent to a Diversion Airport; Filed on Feb. 18, 2016 and assigned U.S. Appl. No. 15/047,355.

ForeFlight Mobile Product Page Nov. 19, 2015; Reference Notes Last accessed at http://foreflight.com/products/foreflight-mobile.

AVPlan EFB Plan Faster, Fly Sooner Nov. 19, 2015; Reference Notes Last accessed at http://www.avplan-efb.com/avplan.

AivlaSoft Electronic Flight Bag—Cockpit efficiency and situational awareness Nov. 19, 2015; Reference Notes Last accessed at http://www.aivlasoft.com/index.html.

Iopscience Landing on empty: estimating the benefits from reducing fuel uplift in US Civil Aviation, iopscience Dec. 31, 2015; Reference Notes http://iopscience.iop.org/article/10.1088/1748-9326/10/9/094002/pdf.

Stackexchange aviation http://aviation.stackexchange.com/ Dec. 31, 2014; Reference Notes http://aviation.stackexchange.com/questions/2854/when-are-aircraft-required-to-dump-fuel-for-emergency-landings.

What to Consider Overweight Landing? aero quarterly Dec. 31, 2007; Reference Notes http://www.boeing.com/commercial/aeromagazine/articles/qtr_3_07/AERO_Q307_article3.pdf.

FlightGear Forum; Using a Canvas Map in the GUI; 2012.

Automated Ceiling Reports ForeFlight; 2015.

iPad Pilot News; 10 tips to increase your runway awareness with ForeFlight; 2015.

Chmelarova et al.; Methods and Systems for Presenting En Route Diversion Destinations; filed Sep. 7, 2016 and assigned U.S. Appl. No. 15/258,400.

Moravek, Z. et al.; Flight Plan Segmentation for En Route Diversion Destinations; filed Nov. 21, 2016 and assigned U.S. Appl. No. 15/357,086.

Extended EP Search Report for Application No. 16197629.5-1803 dated Jul. 4, 2017.

USPTO Notice of Allowance for U.S. Appl. No. 15/019,675 dated Jan. 26, 2017.

USPTO Office Action for U.S. Appl. No. 14/953,635 dated Jun. 19, 2017.

USPTO Restriction Requirement for U.S. Appl. No. 15/047,355 dated Jun. 19, 2017.

Extended EP Search Report for Application No. 17152071.1-1557 dated Jul. 3, 2017.

Partial EP Search Report for Application No. 17164877.7-1803 dated Sep. 26, 2017.

\* cited by examiner

METHODS AND SYSTEMS FOR CONVEYING DESTINATION VIABILITY

TECHNICAL FIELD

The subject matter described herein relates generally to vehicle display systems, and more particularly, embodiments of the subject matter relate to aircraft systems capable of concisely presenting runway viability information in a manner that reduces a pilot's workload, particularly in the case of an emergency or other diversion.

BACKGROUND

Pilots, air traffic controllers, airline personnel and the like routinely monitor meteorological data, reports, and forecasts to assess any potential impacts on the current or anticipated flight plan and the intended destination. However, in situations where the aircraft needs to deviate from the original plan, such as an emergency situation, the information needs to be reanalyzed with respect to the deviation to facilitate continued safe operation. For example, in the case of an emergency landing, ideally a pilot would select an airport within range of the aircraft where landing is least likely to be compromised or complicated by weather or other factors. This requires consideration of numerous pieces of information (e.g., fuel remaining and distance to be traveled, weather radar and/or forecast information, NOTAMs, SIGMETs, PIREPs, and the like), which often is distributed across different displays or instruments, requiring the pilot to mentally piece together all the different information from the different sources. In the case where the information for the first airport analyzed discourages landing there, the pilot must repeat the task of aggregating and analyzing the information for one or more additional airports. Once a diversion airport is selected, the pilot may need to further analyze the various runways at the diversion airport and determine their relative suitability for landing. Additionally, the time-sensitive nature of aircraft operation can increase the stress on the pilot, which, in turn, increases the likelihood of pilot error. Accordingly, it is desirable to reduce the mental workload of the pilot (or air traffic controller, or the like) and provide an accurate and reliable comprehensive view of a complex situation.

BRIEF SUMMARY

Methods and systems are provided for facilitating analysis and selection of a destination for operating a vehicle, such as an aircraft. One exemplary method of facilitating analysis of landing an aircraft at an airport involves displaying, on a display device, a map of the airport including a graphical representation of a runway at the airport, determining a runway viability parameter for the runway based at least in part on current information associated with one or more of the aircraft and the airport, and displaying indicia of the runway viability parameter on the map in graphical association with the graphical representation of the runway.

An apparatus for a vehicle system is also provided. The system includes a display device having a map including a graphical representation of a destination for a vehicle displayed thereon and a processing system coupled to the display device. The processing system determines a viability parameter for the destination based at least in part on current information associated with one or more of the vehicle and the destination and displays indicia of the viability parameter on the map in association with the graphical representation of the destination.

In another embodiment, a method of facilitating analysis of a destination for a vehicle involves displaying, on a display device onboard the vehicle, a map of the destination, obtaining, by a processing system onboard the vehicle, current information associated with one or more of the vehicle and the destination from one or more onboard systems coupled to the processing system, calculating, by the processing system, a viability parameter for the destination based at least in part on the current information, and providing, by the processing system, indicia of the viability parameter on the map.

BRIEF DESCRIPTION OF THE DRAWINGS

Embodiments of the subject matter will hereinafter be described in conjunction with the following drawing figures, wherein like numerals denote like elements, and.

DETAILED DESCRIPTION

Figure 1:
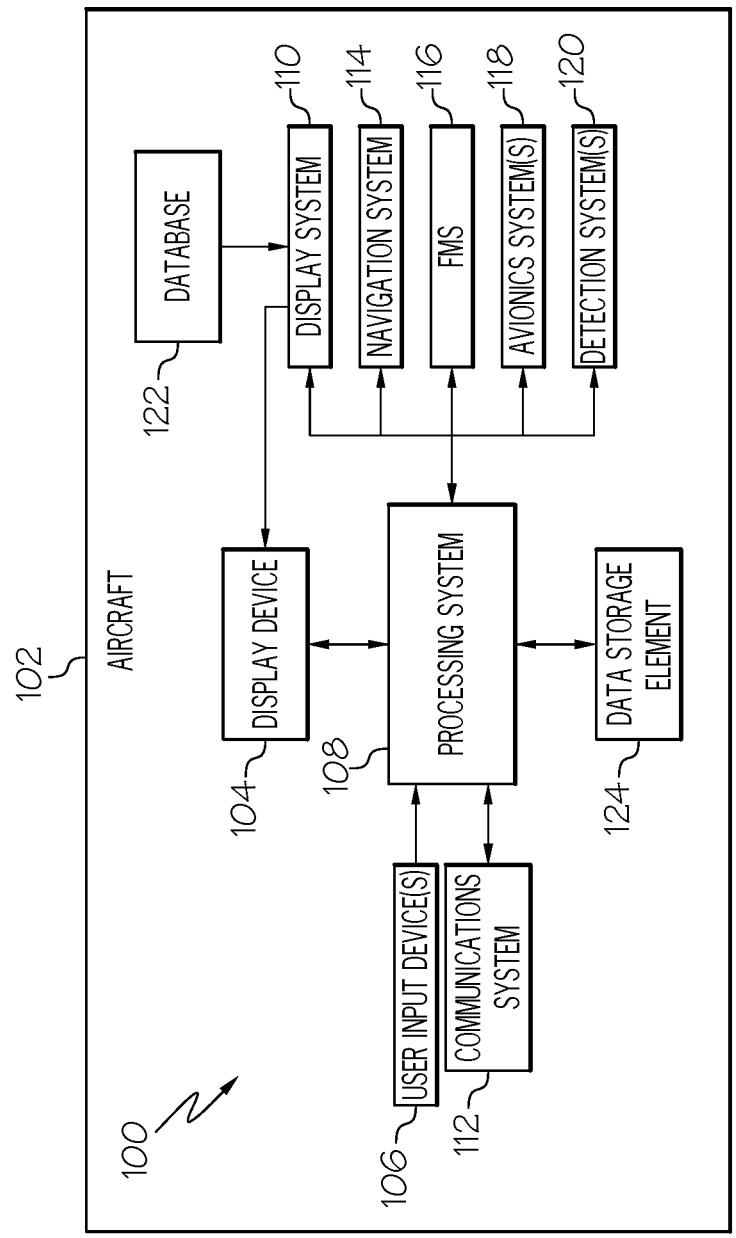
FIG. 1 is a block diagram of a system for an aircraft in an exemplary embodiment.

Embodiments of the subject matter described herein generally relate to systems and methods for conveying relative viability of access by a vehicle for various locations at a destination. While the subject matter described herein could be utilized in various applications or in the context of various types of vehicles (e.g., automobiles, marine vessels, trains, or the like), for purposes of explanation but without limitation, exemplary embodiments are described herein in the context of conveying relative viability of runways at an airport for an aircraft. That said, the subject matter may be implemented in other contexts in an equivalent manner (e.g., to convey viability of terminals, moorings, piers, and the like for a marine vessel at a port or harbor). Additionally, for purposes of explanation, the subject matter is described herein in the context of presenting information pertaining to aircraft operations in the event of a diversion where the destination airport is not the originally intended or planned destination airport for a flight plan; however, it will be appreciated that the subject matter described herein is not limited to use in conjunction with diversions.

As described in greater detail below in the context of FIGS. 2-8, exemplary embodiments described herein calculate or otherwise determine one or more viability parameters pertaining to operating the aircraft with respect to a particular runway at an airport of interest, and then display, render, or otherwise present graphical indicia of the viability parameter(s) in a manner that is graphically associated with that runway. In this regard, a viability parameter quantifies the current viability (or lack thereof) of the aircraft landing on that runway, with the graphical indicia associated with the runway providing a readily discernable indication of the viability of that runway. For example, symbology representative of or otherwise influenced by the viability parameter(s) may be displayed proximate a graphical representation of the runway. In one or more embodiments, a navigational map of the airport including graphical representations of each runway at the airport is presented on a display device, with viability parameters being determined for each runway and corresponding symbology presented in graphical association with the graphical representation of that respective runway. In exemplary embodiments, the viability parameter(s) are calculated or otherwise determined based at least in part on current or real-time status information associated with the aircraft and/or the airport, such as, for example, the current altitude, airspeed, weight, and/or other characteristics of the aircraft, the current operational status of the runways and/or taxiways at the airport, the current meteorological information at or near the airport, and the like.

In one or more embodiments, the runway viability indicia are presented in conjunction with presenting potential diversion destinations to a pilot. For example, potential diversion airports may be scored, graded, or otherwise quantified in terms of their respective viabilities in real-time based at least in part on the current status information associated with the aircraft and the current status information associated with each respective airport. Each airport may then be classified, categorized, or otherwise assigned to a particular aggregate viability group, with the airports then ranked, sorted, or otherwise ordered relative to other airports in that group based on their associated parameter group viability scores. A listing of the potential diversion airports is then displayed or otherwise presented, with the airports within the listing being ranked, sorted, or otherwise ordered primarily by their viability groupings, and then ranked, sorted, or otherwise ordered secondarily within the viability groupings in a manner that reflects the parameter group viability scores. This allows the pilot to quickly discern which destinations are more or less viable relative to other destinations. From there, the pilot may select or otherwise indicate a particular diversion airport from within the list, which, in turn, results in a navigational map of that airport being presented on the display device, with the airport map including graphical representations of the runways at that airport along with symbology or other graphical indicia of viability parameters associated with each runway at the airport. Thus, the pilot can quickly discern which runways are more or less viable relative to other runways at that particular airport. Accordingly, as described in greater detail below, a pilot can quickly identify both the relative viability of a particular airport of interest relative to other airports, while also quickly identifying the relative viability of the runways at that airport without having to manually piece together and analyze various disparate pieces of information from different sources, and thereby arrive at a determination of both a particular airport to divert to as well as a particular runway at that airport for which landing is desirable.

Referring now to FIG. 1, an exemplary embodiment of a system 100 which may be located onboard a vehicle, such as an aircraft 102, includes, without limitation, a display device 104, a user input device 106, a processing system 108, a display system 110, a communications system 112, a navigation system 114, a flight management system (FMS) 116, one or more avionics systems 118, one or more detection systems 120, and one or more data storage elements 122, 124 cooperatively configured to support operation of the system 100, as described in greater detail below.

In exemplary embodiments, the display device 104 is realized as an electronic display capable of graphically displaying flight information or other data associated with operation of the aircraft 102 under control of the display system 110 and/or processing system 108. In this regard, the display device 104 is coupled to the display system 110 and the processing system 108, wherein the processing system 108 and the display system 110 are cooperatively configured to display, render, or otherwise convey one or more graphical representations or images associated with operation of the aircraft 102 on the display device 104. For example, as described in greater detail below, a navigational map that includes a graphical representation of the aircraft 102 and one or more of the terrain, meteorological conditions, airspace, air traffic, navigational reference points, and a route associated with a flight plan of the aircraft 102 may be displayed, rendered, or otherwise presented on the display device 104.

The user input device 106 is coupled to the processing system 108, and the user input device 106 and the processing system 108 are cooperatively configured to allow a user (e.g., a pilot, co-pilot, or crew member) to interact with the display device 104 and/or other elements of the aircraft system 100, as described in greater detail below. Depending on the embodiment, the user input device 106 may be realized as a keypad, touchpad, keyboard, mouse, touch panel (or touchscreen), joystick, knob, line select key or another suitable device adapted to receive input from a user. In some embodiments, the user input device 106 is realized as an audio input device, such as a microphone, audio transducer, audio sensor, or the like, that is adapted to allow a user to provide audio input to the aircraft system 100 in a "hands free" manner without requiring the user to move his or her hands, eyes and/or head to interact with the aircraft system 100.

The processing system 108 generally represents the hardware, circuitry, processing logic, and/or other components configured to facilitate communications and/or interaction between the elements of the aircraft system 100 and perform additional processes, tasks and/or functions to support operation of the aircraft system 100, as described in greater detail below. Depending on the embodiment, the processing system 108 may be implemented or realized with a general purpose processor, a controller, a microprocessor, a microcontroller, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. In practice, the processing system 108 includes processing logic that may be configured to carry out the functions, techniques, and processing tasks associated with the operation of the aircraft system 100 described in greater detail below. Furthermore, the steps of a method or algorithm described in connection with the embodiments disclosed herein may be embodied directly in hardware, in firmware, in a software module executed by the processing system 108, or in any practical combination thereof. In accordance with one or more embodiments, the processing system 108 includes or otherwise accesses a data storage element 124, such as a memory (e.g., RAM memory, ROM memory, flash memory, registers, a hard disk, or the like) or another suitable non-transitory short or long term storage media capable of storing computer-executable programming instructions or other data for execution that, when read and executed by the processing system 108, cause the processing system 108 to execute and perform one or more of the processes, tasks, operations, and/or functions described herein.

The display system 110 generally represents the hardware, firmware, processing logic and/or other components configured to control the display and/or rendering of one or more displays pertaining to operation of the aircraft 102 and/or systems 112, 114, 116, 118, 120 on the display device 104 (e.g., synthetic vision displays, navigational maps, and the like). In this regard, the display system 110 may access or include one or more databases 122 suitably configured to support operations of the display system 110, such as, for example, a terrain database, an obstacle database, a navigational database, a geopolitical database, a terminal airspace database, a special use airspace database, or other information for rendering and/or displaying navigational maps and/or other content on the display device 104. In this regard, in addition to including a graphical representation of terrain, a navigational map displayed on the display device 104 may include graphical representations of navigational reference points (e.g., waypoints, navigational aids, distance measuring equipment (DMEs), very high frequency omnidirectional radio ranges (VORs), and the like), designated special use airspaces, obstacles, and the like overlying the terrain on the map.

As described in greater detail below, in an exemplary embodiment, the processing system 108 includes or otherwise accesses a data storage element 124 (or database), which maintains information regarding airports and/or other potential landing locations (or destinations) for the aircraft 102. In this regard, the data storage element 124 maintains an association between a respective airport, its geographic location, runways (and their respective orientations and/or directions), instrument procedures (e.g., approaches, arrival routes, and the like), airspace restrictions, and/or other information or attributes associated with the respective airport (e.g., widths and/or weight limits of taxi paths, the type of surface of the runways or taxi path, and the like). Additionally, in accordance with one or more embodiments, the data storage element 124 also maintains status information for the runways and/or taxi paths at the airport indicating whether or not a particular runway and/or taxi path is currently operational along with directional information for the taxi paths (or portions thereof). The data storage element 124 may also be utilized to store or maintain other information pertaining to the airline or aircraft operator (e.g., contractual agreements or other contractual availability information for particular airports, maintenance capabilities or service availability information for particular airports, and the like) along with information pertaining to the pilot and/or co-pilot of the aircraft (e.g., experience level, licensure or other qualifications, work schedule or other workload metrics, such as stress or fatigue estimates, and the like).

Still referring to FIG. 1, in an exemplary embodiment, the processing system 108 is coupled to the navigation system 114, which is configured to provide real-time navigational data and/or information regarding operation of the aircraft 102. The navigation system 114 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 114, as will be appreciated in the art. The navigation system 114 is capable of obtaining and/or determining the instantaneous position of the aircraft 102, that is, the current (or instantaneous) location of the aircraft 102 (e.g., the current latitude and longitude) and the current (or instantaneous) altitude (or above ground level) for the aircraft 102. The navigation system 114 is also capable of obtaining or otherwise determining the heading of the aircraft 102 (i.e., the direction the aircraft is traveling in relative to some reference).

In an exemplary embodiment, the processing system 108 is also coupled to the FMS 116, which is coupled to the navigation system 114, the communications system 112, and one or more additional avionics systems 118 to support navigation, flight planning, and other aircraft control functions in a conventional manner, as well as to provide real-time data and/or information regarding the operational status of the aircraft 102 to the processing system 108. It should be noted that although FIG. 1 depicts a single avionics system 118, in practice, the aircraft system 100 and/or aircraft 102 will likely include numerous avionics systems for obtaining and/or providing real-time flight-related information that may be displayed on the display device 104 or otherwise provided to a user (e.g., a pilot, a co-pilot, or crew member). For example, practical embodiments of the aircraft system 100 and/or aircraft 102 will likely include one or more of the following avionics systems suitably configured to support operation of the aircraft 102: a weather system, an air traffic management system, a radar system, a traffic avoidance system, an autopilot system, an autothrust system, a flight control system, hydraulics systems, pneumatics systems, environmental systems, electrical systems, engine systems, trim systems, lighting systems, crew alerting systems, electronic checklist systems, an electronic flight bag and/or another suitable avionics system.

In the illustrated embodiment, the onboard detection system(s) 120 generally represents the component(s) of the aircraft 102 that are coupled to the processing system 108 and/or the display system 110 to generate or otherwise provide information indicative of various objects or regions of interest within the vicinity of the aircraft 102 that are sensed, detected, or otherwise identified by a respective onboard detection system 120. For example, an onboard detection system 120 may be realized as a weather radar system or other weather sensing system that measures, senses, or otherwise detects meteorological conditions in the vicinity of the aircraft 102 and provides corresponding radar data (e.g., radar imaging data, range setting data, angle setting data, and/or the like) to one or more of the other onboard systems 108, 110, 114, 116, 118 for further processing and/or handling. For example, the processing system 108 and/or the display system 110 may generate or otherwise provide graphical representations of the meteorological conditions identified by the onboard detection system 120 on the display device 104 (e.g., on or overlying a lateral navigational map display). In another embodiment, an onboard detection system 120 may be realized as a collision avoidance system that measures, senses, or otherwise detects air traffic, obstacles, terrain and/or the like in the vicinity of the aircraft 102 and provides corresponding detection data to one or more of the other onboard systems 108, 110, 114, 116, 118.

In the illustrated embodiment, the processing system 108 is also coupled to the communications system 112, which is configured to support communications to and/or from the aircraft 102 via a communications network. For example, the communications system 112 may also include a data link system or another suitable radio communication system that supports communications between the aircraft 102 and one or more external monitoring systems, air traffic control, and/or another command center or ground location. In this regard, the communications system 112 may allow the aircraft 102 to receive information that would otherwise be unavailable to the pilot and/or co-pilot using the onboard systems 114, 116, 118, 120. For example, the communications system 112 may receive meteorological information from an external weather monitoring system, such as a Doppler radar monitoring system, a convective forecast system (e.g., a collaborative convective forecast product (CCFP) or national convective weather forecast (NCWF) system), an infrared satellite system, or the like, that is capable of providing information pertaining to the type, location and/or severity of precipitation, icing, turbulence, convection, cloud cover, wind shear, wind speed, lightning, freezing levels, cyclonic activity, thunderstorms, or the like along with other weather advisories, warnings, and/or watches. The meteorological information provided by an external weather monitoring system may also include forecast meteorological data that is generated based on historical trends and/or other weather observations, and may include forecasted meteorological data for geographical areas that are beyond the range of any weather detection systems 120 onboard the aircraft 102. In other embodiments, the processing system 108 may store or otherwise maintain historic meteorological data previously received from an external weather monitoring system, with the processing system 108 calculating or otherwise determining forecast meteorological for geographic areas of interest to the aircraft 102 based on the stored meteorological data and the current (or most recently received) meteorological data from the external weather monitoring system. In this regard, the meteorological information from the external weather monitoring system may be operationally used to obtain a "big picture" strategic view of the current weather phenomena and trends in its changes in intensity and/or movement with respect to prospective operation of the aircraft 102.

It should be understood that FIG. 1 is a simplified representation of the aircraft system 100 for purposes of explanation and ease of description, and FIG. 1 is not intended to limit the application or scope of the subject matter described herein in any way. It should be appreciated that although FIG. 1 shows the display device 104, the user input device 106, and the processing system 108 as being located onboard the aircraft 102 (e.g., in the cockpit), in practice, one or more of the display device 104, the user input device 106, and/or the processing system 108 may be located outside the aircraft 102 (e.g., on the ground as part of an air traffic control center or another command center) and communicatively coupled to the remaining elements of the aircraft system 100 (e.g., via a data link and/or communications system 112). In this regard, in some embodiments, the display device 104, the user input device 106, and/or the processing system 108 may be implemented as an electronic flight bag that is separate from the aircraft 102 but capable of being communicatively coupled to the other elements of the aircraft system 100 when onboard the aircraft 102. Similarly, in some embodiments, the data storage element 124 may be located outside the aircraft 102 and communicatively coupled to the processing system 108 via a data link and/or communications system 112. Furthermore, practical embodiments of the aircraft system 100 and/or aircraft 102 will include numerous other devices and components for providing additional functions and features, as will be appreciated in the art. In this regard, it will be appreciated that although FIG. 1 shows a single display device 104, in practice, additional display devices may be present onboard the aircraft 102. Additionally, it should be noted that in other embodiments, features and/or functionality of processing system 108 described herein can be implemented by or otherwise integrated with the features and/or functionality provided by the display system 110 or the FMS 116, or vice versa. In other words, some embodiments may integrate the processing system 108 with the display system 110 or the FMS 116; that is, the processing system 108 may be a component of the display system 110 and/or the FMS 116.

Figure 2:
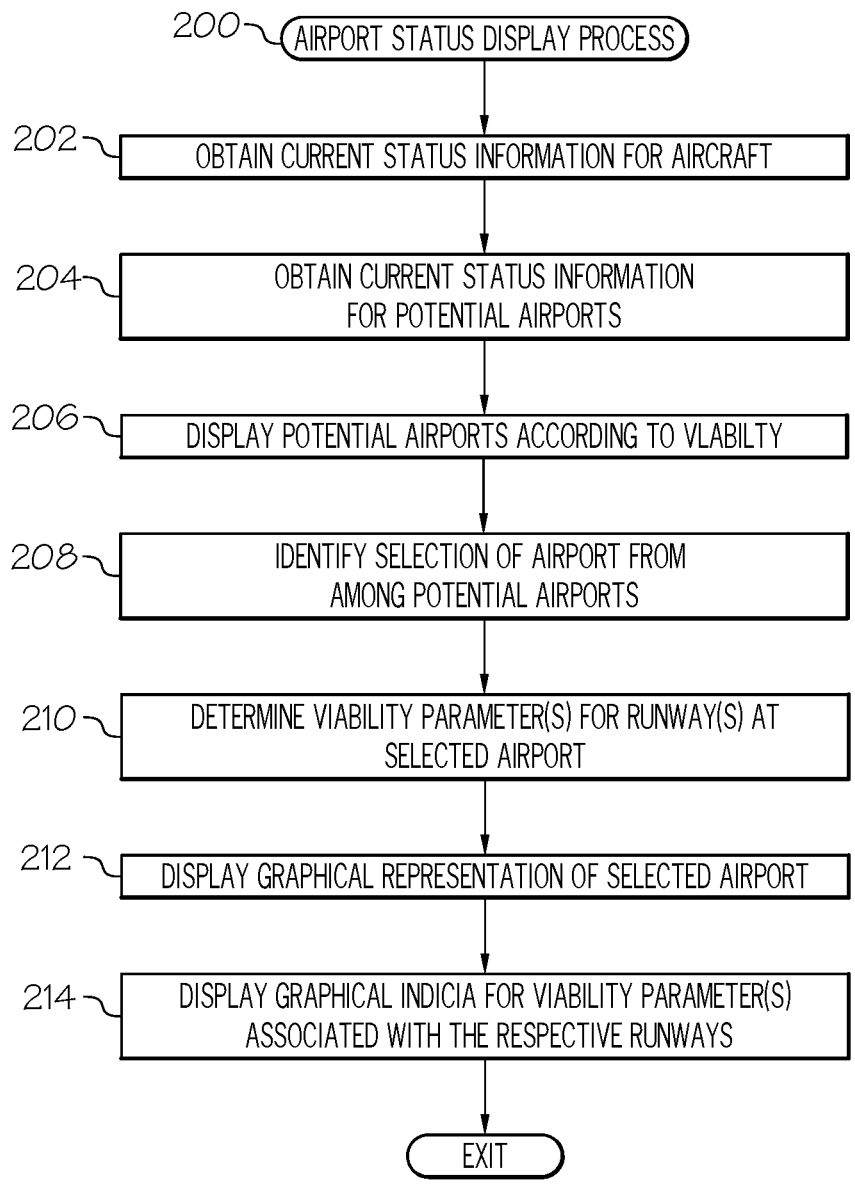
FIG. 2 is a flow diagram of an exemplary airport status display process suitable for use with the aircraft in the system of FIG. 1 in accordance with one or more embodiments.

Referring now to FIG. 2, in an exemplary embodiment, the system 100 is configured to support an airport status display process 200 and perform additional tasks, functions, and operations described below. The various tasks performed in connection with the illustrated process 200 may be implemented using hardware, firmware, software executed by processing circuitry, or any combination thereof. For illustrative purposes, the following description may refer to elements mentioned above in connection with FIG. 1. In practice, portions of the airport status display process 200 may be performed by different elements of the system 100, such as, the processing system 108, the display system 110, the communications system 112, the navigation system 114, the FMS 116, the onboard avionics systems 118 and/or the onboard detection systems 120. It should be appreciated that the airport status display process 200 may include any number of additional or alternative tasks, the tasks need not be performed in the illustrated order and/or the tasks may be performed concurrently, and/or the airport status display process 200 may be incorporated into a more comprehensive procedure or process having additional functionality not described in detail herein. Moreover, one or more of the tasks shown and described in the context of FIG. 2 could be omitted from a practical embodiment of the airport status display process 200 as long as the intended overall functionality remains intact.

Still referring to FIG. 2, and with continued reference to FIG. 1, in an exemplary embodiment, the illustrated display process 200 begins by receiving or otherwise obtaining current status information pertaining to the aircraft (task 202). The current status information pertaining to the aircraft 102 generally represents the instantaneous, real-time or most recent available values for one or more parameters that quantify the current operation of the aircraft 102. In this regard, the current aircraft status information provides one or more base parameters for scoring or otherwise grading the viability of landing the aircraft 102 at an airport. For example, the processing system 108 may obtain (e.g., from FMS 116, navigation system 114 and/or other avionic systems 118) one or more of the following: the current location of the aircraft 102, the current altitude (or above ground level) of the aircraft 102, the current heading (or bearing) of the aircraft 102, the current amount of fuel remaining onboard the aircraft 102, the current engine status (e.g., whether any engine is disabled, whether afterburners are in operation, the current revolutions per minute, and/or the like), the current aircraft configuration (e.g., the current flap configuration). Additionally, the processing system 108 may obtain, either from the onboard detection systems 120 or an external system via communications system 112, current meteorological conditions at or near the current location of the aircraft 102 (e.g., the current temperature, wind speed, wind direction, atmospheric pressure, turbulence, and the like).

The airport status display process 200 also receives or otherwise obtains current status information pertaining to the airports to be analyzed (task 204). In this regard, the current status information pertaining to the airports generally represents the instantaneous, real-time or most recent available information that quantifies the current operations at the respective airports within the geographic area of interest for the display process 200. The current airport status information associated with a particular airport provides one or more base parameters for scoring or otherwise grading the viability of that airport. For example, the processing system 108 may obtain, for each airport, one or more of the following: the current meteorological conditions at or near the airport, the current operational status of the runways and/or taxiways at the airport, any current operational restrictions associated with the runways and/or taxiways at the airport, the current operational status or restrictions associated with any landing systems, lighting systems, or other systems on the ground at the airport, the current air traffic conditions for the airport, any current auxiliary reports applicable to the airport (e.g., NOTAMs, PIREPs, SIGMETs, and the like), any current airspace restrictions, current meteorological forecast information for the geographic area encompassing the airport, and the like.

In one or more exemplary embodiments, the airport status display process 200 continues by displaying or otherwise presenting a list of the airports being analyzed that is ordered or ranked based on their respective viabilities (task 206). For example, in one embodiment, for each airport within a geographic area of interest, the processing system 108 determines a respective parameter group viability score for each of a plurality of parameter groups using the real-time status information for that airport and the aircraft. Based on the respective parameter group viability states, the airports may then be classified into different aggregate viability groups, which represent a subset of the airports within the geographic area of interest having a substantially similar viability status. Each airport may then be ranked within its respective viability group based on its respective parameter group viability scores relative to those of other airports within its respective aggregate viability group. Thus, better or more preferred airports may be discerned from other airports with the same general viability. Thereafter, the identified airports within the geographic area of interest are then ranked or otherwise ordered primarily based on the respective aggregate viability groupings and then secondarily based on each respective airports relative ranking within its respective aggregate viability group, resulting in a prioritized list of the potential diversion destinations within the geographic area of interest. In this regard, the airports presented within the diversion list may be ordered independently of any flight plans for the aircraft 102, that is, the planned destination airport for the aircraft 102 may be ranked below other airports based on the parameter group viability states and scores regardless of its flight plan designation.

Figure 4:
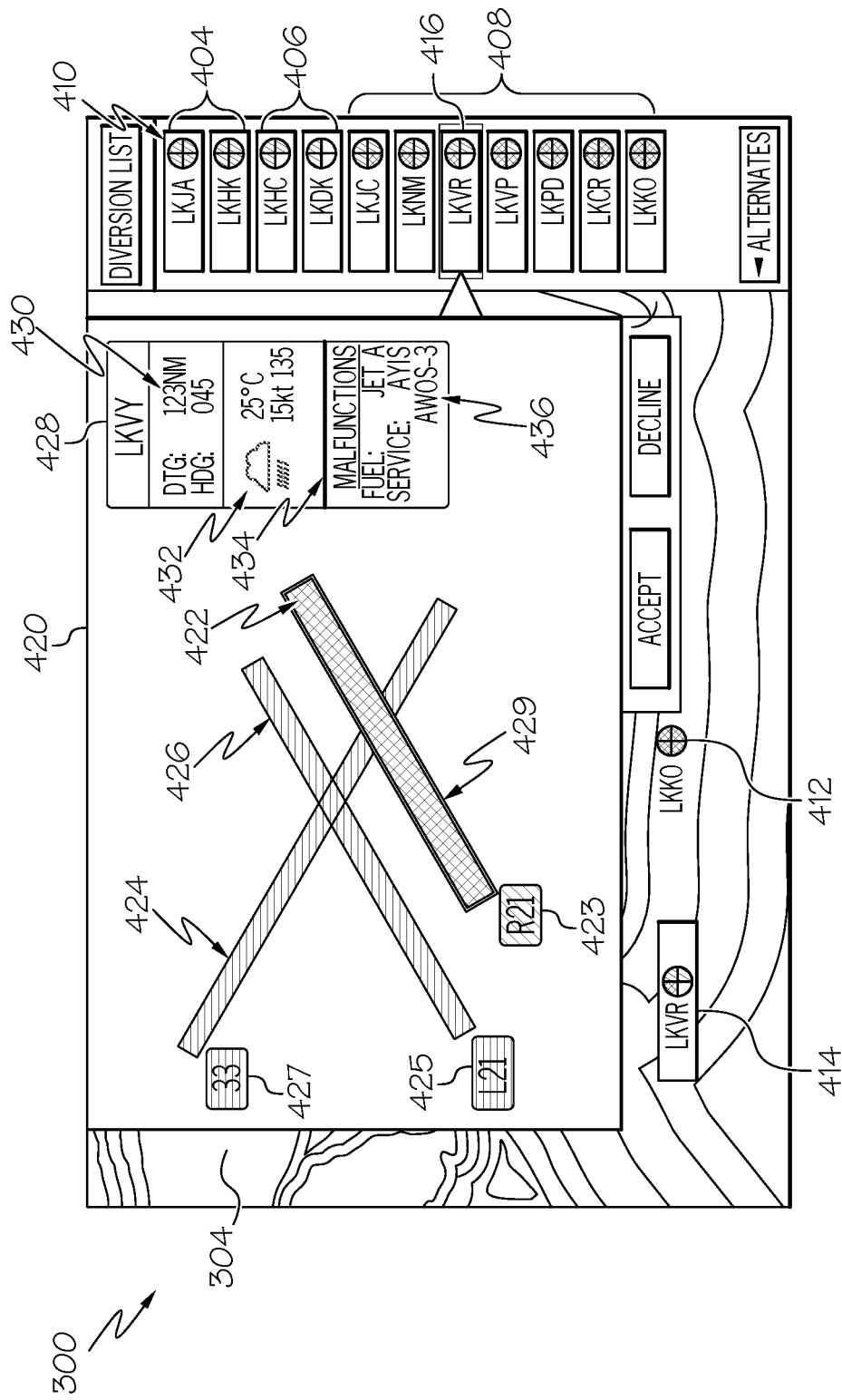

As described in greater detail in U.S. patent application Ser. No. 14/953,635, in an exemplary embodiment, the processing system 108 and/or the display system 110 displays or otherwise presents an ordered list of the ranked airports and provides, on the display, graphical indicia of the respective parameter group viability states for each airport in the list, as illustrated in FIG. 4. Each parameter group viability state may be rendered with a visually distinguishable characteristic that is different from those of the other parameter group viability states. A parameter group viability state can be influenced by base parameters as well as complex parameters that are calculated, determined, or otherwise derived based at least in part on one or more current status base parameters (e.g., one or more pieces of the current status information for the airport and/or the airport). For example, a runway viability parameter, such as a stopping distance or braking distance, a landing weight, or the like, may be calculated for a runway at a particular airport of interest based on the length of the runway, the current meteorological conditions at the airport, the current weight of the aircraft, the estimated fuel burn for traveling from the current location and altitude of the aircraft to the airport, and other parameters influencing the braking performance of the aircraft. In this regard, the processing system 108 may calculate the length required to stop the aircraft 102 based on the anticipated aircraft weight at the estimated time of arrival for the airport, the landing speed for the aircraft, and the anticipated surface conditions of the runway based on the current meteorological conditions at the airport. It should be noted that any number or type of complex parameters may be calculated for a particular airport or runway. Runway viability parameter value(s) may then be classified into the appropriate parameter group for a given embodiment (e.g., Airport Availability), and, in turn, may influence the parameter group viability state or score.

Still referring to FIG. 2, in exemplary embodiments, the airport status display process 200 continues by identifying selection of a particular airport of interest on the display (task 208). In response to selection of a particular airport, the airport status display process 200 determines one or more viability parameter(s) for one or more runway(s) at the airport (task 210). In some embodiments, the runway viability parameters include values or states for complex parameters that were previously determined for the purposes of scoring or ranking the airports across different parameter groups. That said, the runway viability parameters may also include additional complex parameter values or states that were not previously determined for purposes of scoring the airports, and are calculated in response to selection or indication of a particular airport based on base status parameters associated with that airport and/or the aircraft 102. The airport status display process 200 displays or otherwise presents a graphical representation of the selected airport that includes graphical representation(s) of the runway(s) at the airport, and displays or otherwise presents graphical indicia of the runway viability parameter(s) in graphical or visual association with the respective runway associated therewith (tasks 212, 214). In this regard, symbology representative of a runway viability parameter value or state for a particular runway may be displayed adjacent or proximate to the graphical representation of that corresponding runway, overlying the graphical representation of that corresponding runway, or otherwise presented in a manner that facilitates an association between the runway and its viability parameter. Additionally or alternatively, other graphical indicia of a runway viability parameter value or state for a particular runway may be displayed adjacent to, proximate to, overlying, or otherwise in visual or graphical association with the graphical representation of its corresponding runway. For example, a graphical representation of runway may be rendered with a visually distinguishable characteristic (e.g., a shading, fill pattern, texture, hue, or the like) that indicates a particular viability parameter state or value. In other embodiments, a graphical representation of runway may be highlighted, outlined, or otherwise emphasized in a visually distinguishable manner that indicates a particular viability parameter state or value. In yet other embodiments, a textual label for the runway may be rendered with a visually distinguishable characteristic that indicates a particular viability parameter state or value.

In exemplary embodiments, for each runway at an airport of interest, the processing system 108 determines a plurality of viability parameters, which are then graphically indicated for each runway at the airport on a map of the airport. Thus, upon selection of an airport for analysis, a pilot is presented with a comprehensive view of the viability for all of the runways at the airport, from which the pilot may then make a determination of whether and how to proceed with respect to that airport. For example, the pilot may utilize the symbology and other indicia of the runway viability parameters to identify a desired runway for landing (for which the pilot may request clearance from air traffic control or the like), or alternatively, if the pilot is unsatisfied with the viable runways, the pilot may revert back to analyze one or more different airports until identifying a desired combination of runway and airport for proceeding based on the current situation and the nature of the diversion.

Figure 3:
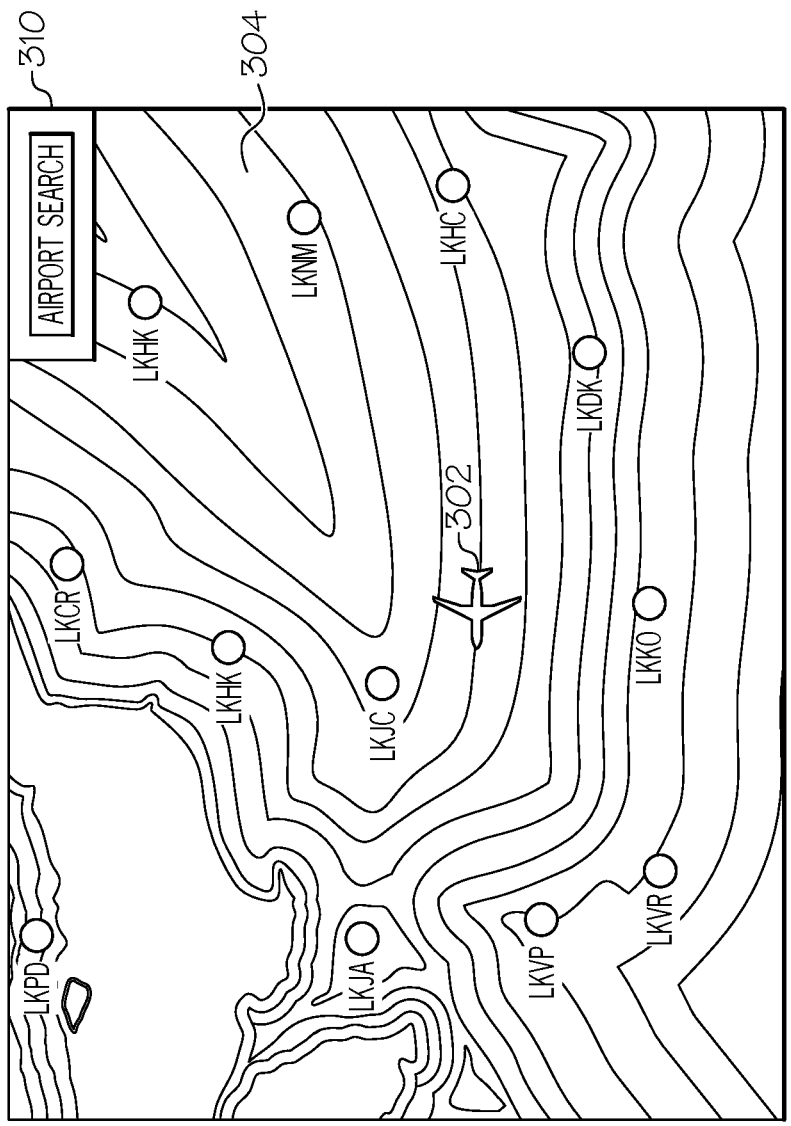
FIGS. 3-4 depict an exemplary sequence of navigational map displays suitable for use with the airport status display process of FIG. 2 in accordance with one or more embodiments.

FIGS. 3-4 depict an exemplary sequence of navigational map displays that may be displayed, rendered, or otherwise presented on the display device 104 in conjunction with the display process 200 of FIG. 2. The display system 110 and/or processing system 108 displays and/or renders the navigational map 300 on the display device 104. The illustrated navigational map 300 includes a graphical representation 302 of the aircraft 102 overlaid or rendered on top of a background 304. The background 304 comprises a graphical representation of the terrain, topology, navigational reference points, airspace designations and/or restrictions, or other suitable items or points of interest corresponding to the currently displayed area of the navigational map 300, which may be maintained in a terrain database, a navigational database, a geopolitical database, or another suitable database (e.g., database 122). For example, the display system 110 may render a graphical representation of nearby navigational aids (e.g., VORs, VORTACs, DMEs, and the like) and airports within the currently displayed geographic area of the navigational map 300 overlying the background 304. Some embodiments of navigational map 300 may also include graphical representations of airspace designations and/or airspace restrictions, cities, towns, roads, railroads, and other geo-political information. In addition, depending on the embodiment, the display process 200 may render other real-time flight related information that is within the geographic area corresponding to the currently displayed area of the navigational map 300 or within a particular proximity of the aircraft, such as, for example, weather conditions, radar data, neighboring air traffic, and the like, as will be appreciated in the art.

Although FIG. 3 depicts a top view (e.g., from above the aircraft 302) of the navigational map 300 (alternatively referred to as a lateral map or lateral view), in practice, alternative embodiments may utilize various perspective views, such as side views, three-dimensional views (e.g., a three-dimensional synthetic vision display), angular or skewed views, and the like. The displayed area of the navigational map 300 corresponds to the geographic area that is currently displayed in the navigational map 300, that is, the field of view about the center location of the navigational map 300. As used herein, the center location of the navigational map 300 comprises a reference location for the middle or geometric center of the navigational map 300 which corresponds to a geographic location.

In an exemplary embodiment, the navigational map 300 is associated with the movement of the aircraft 102, and the aircraft symbology 302 and/or background 304 refreshes or otherwise updates as the aircraft 102 travels, such that the graphical representation of the aircraft 302 is positioned over the terrain background 304 in a manner that accurately reflects the current (e.g., instantaneous or substantially real-time) real-world positioning of the aircraft 102 relative to the earth. In some embodiments, the aircraft symbology 302 is shown as traveling across the navigational map 300 (e.g., by updating the location of the aircraft symbology 302 with respect to the background 304), while in other embodiments, the aircraft symbology 302 may be located at a fixed position on the navigational map 300 (e.g., by updating the background 304 with respect to the aircraft graphic 302 such that the map 300 is maintained centered on and/or aligned with the aircraft graphic 302). Additionally, depending on the embodiment, the navigational map 300 may be oriented in a cardinal direction (e.g., oriented north-up so that moving upward on the map 300 corresponds to traveling northward), or alternatively, the orientation of the navigational map 300 may be track-up or heading-up (i.e., aligned such that the aircraft symbology 302 is always traveling in an upward direction and the background 304 adjusted accordingly).

In some embodiments, the map 300 may be centered on the aircraft 302 such that the center location of the navigational map 300 corresponds to the current location of the aircraft 302. In this regard, the center location of the navigational map 300 may be updated or refreshed such that it corresponds to the instantaneous location of the aircraft 102 as the aircraft travels, as will be appreciated in the art. In alternative embodiments, the center location of the navigational map 300 may correspond to a geographic location that is independent of the current location of the aircraft 102, for example, when a user manipulates a user input device 106 to scroll the displayed area of the navigational map or select a portion of the displayed area that does not include the aircraft symbology 302.

The illustrated navigational map 300 includes a GUI element 310 (e.g., a button or the like) that is selectable or otherwise manipulable by a user to initiate an airport list display process, resulting in the updated navigational map display of FIG. 4 being presented on the display device 104 that includes a graphical representation of an ordered list 402 of potential diversion airports. In this regard, the diversion airport list 402 may be presented within a graphical user interface or window that overlies a peripheral portion of the navigational map 300 and/or terrain background 304 or is otherwise positioned at or near a border of the navigational map 300 (e.g., by automatically adjusting the resolution of the navigational map 300 to concurrently present the previously displayed geographic area and the diversion airport list 402). As described above, the individual airports in the list 402 may be ordered primarily based on their respective aggregate viability groupings. For example, in the illustrated embodiment, a first grouping 404 of airports having the highest viability is presented with precedence over a second grouping 406 of airports having an intermediate viability, which, in turn, is presented with precedence over a third grouping 408 of airports having the lowest viability. Within each grouping 404, 406, 408, the airports contained therein are ordered or ranked based on their respective parameter group viability scores relative to those of other airports within its respective aggregate viability group 404, 406, 408. In this regard, within the highest viability group 404, airport LKJA is ranked higher than airport LKHK based on their respective parameter group viability scores, and accordingly, airport LKJA is presented above airport LKHK within the diversion list 402. Similarly, within the intermediate viability group 406, airport LKHC is ranked higher than airport LKDK based on their respective parameter group viability scores, and airport LKHC is presented above airport LKDK in the diversion list 402.

In exemplary embodiments, the diversion list 402 also includes, in association with each respective airport, graphical indicia 410 of the parameter group viability states associated with that airport for each parameter group. In the illustrated embodiment, the graphical indicia 410 is realized as a pie chart where the different sectors (or slices) are representative of the different parameter groups. In this regard, FIG. 4 depicts an embodiment where four different parameter groups are being utilized to rank the airports, however, it should be appreciated that the subject matter is not intended to be limited to any particular number of parameter groups or pie charts, and other similar graphics may be utilized to represent the parameter group states in a consolidated manner. Moreover, the parameter groups may be broken out and represented with individual columns or in some other manner.

Still referring to FIG. 4, each of the sectors of the pie chart indicia 410 for the airports in the highest viability grouping 404 may be rendered using the visually distinguishable characteristic associated with the highest parameter group viability state (e.g., green). In this manner, the pilot of the aircraft 102 can quickly identify those airports as having the highest viability state across the various parameter groups. Furthermore, by virtue of their graphical indicia 410 being identical, based on the presentation order and airport LKJA being presented with precedence over airport LKHK (e.g., displayed higher in order), a pilot can quickly identify that airport LKJA was scored higher than airport LKHK based on their individual parameter values, weighting factors, or the like. In other words, any ties between airports based on parameter group states are resolved by calculating or otherwise determining an overall score for each of the airports within the same grouping, and then ranking the airports within that grouping based on their overall scores.

One or more of the sectors of the pie chart indicia 410 for each of the airports in the intermediate viability grouping 406 are rendered using the visually distinguishable characteristic associated with the intermediate parameter group viability state (e.g., yellow), while remaining sectors of the pie chart indicia 410 for each respective airport are rendered using the visually distinguishable characteristic associated with the highest parameter group viability state (e.g., green). Thus, the pilot of the aircraft 102 can quickly identify the number of parameter groups for a particular airport that do not have the highest viability state, as well as identify which parameter group(s) could potentially compromise or complicate landing at that particular airport (e.g., when a pilot trained or versed in the feature is capable of mentally associating pie chart sectors with their corresponding parameter group). For example, in the illustrated embodiment, a pilot is capable of quickly identifying that airport LKHC in the intermediate grouping 406 has one potentially complicating parameter group state associated therewith, while airport LKDK has the same potentially complicating parameter group state associated therewith along with an additional potentially complicating parameter group state. For any airports having identical graphical indicia 410, or alternatively, an identical number of parameter groups with the intermediate viability state, a pilot can quickly identify which airports were scored higher than others having the same relative viability at the parameter group state level based on their individual parameter values, weighting factors, or the like.

One or more of the sectors of the pie chart indicia 410 for each of the airports in the lowest viability grouping 408 are rendered using the visually distinguishable characteristic associated with the lowest parameter group viability state (e.g., red), while remaining sectors of the pie chart indicia 410 for each respective airport are rendered using the visually distinguishable characteristic associated with the other parameter group viability states. Again, the pilot of the aircraft 102 can quickly identify the number and identity of parameter groups for a particular airport that have the lowest viability state which may prevent usage of the airport, as well as ascertaining the relative viability of the other parameter group(s) that do not have the lowest viability state. Additionally, for those airports having identical graphical indicia 410, or alternatively, an identical number of parameter groups per viability state, a pilot can quickly identify which of those airports were scored higher than others having the same relative viability at the parameter group state level based on their individual parameter values, weighting factors, or the like.

Still referring to FIG. 4, in exemplary embodiments, the display process 200 also provides graphical indicia of the parameter group viability states by replacing the airport symbology presented on the navigational map 300 (e.g., the airports within the current geographic area corresponding to the navigational map 300) with updated symbology representative of the parameter group viability states for the airports. In this regard, a consolidated graphical indicia, such as a pie chart, may also be utilized for the airport symbology in lieu of the preceding airport symbology. For example, the symbology overlying the terrain background 304 for airport LKKO may be replaced with a pie chart 412 located at the geographic location associated with airport LKKO and sectors corresponding to the parameter group states for airport LKKO (e.g., all red sectors). Similarly, airport LKVR may be graphically represented on the updated navigational map display with a pie chart 414 at the geographic location associated with airport LKVR and sectors corresponding to the parameter group states for airport LKVR. In this regard, the airport viability symbology 414 for airport LKVR includes one sector with the visually distinguishable characteristic indicating the lowest parameter group state (e.g., red), one sector with the visually distinguishable characteristic indicating the intermediate parameter group state (e.g., yellow), and two other sectors with the visually distinguishable characteristic indicating the highest parameter group state (e.g., high).

Depending on the embodiment, the airport viability symbologies 412, 414 presented overlying the terrain background 304 and/or the individual airport entries (or rows) in the list 402 are selectable. In response to selection of either the airport viability symbology 414 for airport LKVR on the map 300 or the entry 416 for airport LKVR in the list 402, the processing system 108 generates or otherwise provides an airport summary GUI display 420 overlying the navigational map 300. The airport summary GUI display 420 includes a lateral view (or top-down view) of the airport and a graphical representation of the runways 422, 424, 426 at the airport along with a summary panel 428 including detail information pertaining to the parameter group states associated with selected airport LKVR (e.g., task 212). The summary panel 428 may include, for example, text or other symbology 430 representative of current relative location of the airport (e.g. direct distance and relative heading to the airport), text or other symbology 432 representative of the current meteorological conditions at the airport (e.g., cloud cover symbology, temperature and wind speed and direction, or the like) along with a graphically distinct region (defined by a bar 434 or other divider symbology) that includes graphical representations 436 (e.g., text or other symbology) of the viability parameter states or values that influenced the intermediate or lower viability parameter groups for the airport, such as, for example, names of unavailable services at the selected airport.

As described above, the graphical representation of each runway 422, 424, 426 is also associated with graphical indicia or symbology representative of its associated viability parameters (e.g., task 214). For example, the graphical representation of a first runway 422 (21R) is rendered with a visually distinguishable fill pattern that indicates that runway 21R is available and also with a contouring frame 429 (or other outline symbology) that indicates the current runway operational status as active, while the other runways 424, 426 are rendered with a different visually distinguishable fill pattern to indicate they are closed. As described in greater detail below, in some embodiments, the longitudinal dimension of the fill pattern may be less than or greater than that of the runway depiction to indicate the calculated stopping distance or braking distance for the aircraft with respect to that runway. Additionally, the textual symbology 423, 425, 427 (or labels) associated with the runways 423, 425, 427 may include text or other symbols indicating the operational status of the runway. For example, the label symbology 423 associated with the depiction of runway 21R 422 includes background fill pattern to indicate that the instrument landing system associated with runway 21R is turned off or otherwise disabled, while the label symbology 425, 427 associated with the other runways include hatching pattern to indicate those runways are closed. Additionally, the graphical representation of runway 21R 422 may be highlighted, outlined, or otherwise indicated with symbology 429, which may indicate the available length of the runway or some other aspect of operating the aircraft 102 on that runway. In this regard, the illustrated outline symbology 429 circumscribes the runway 21R 422 with a longitudinal dimension greater than or equal to that of the runway 422, thereby indicating that the available length of runway 21R does not compromise the viability of landing the aircraft 102 on that runway. It should be appreciated that FIG. 4 depicts merely one example airport map 420, and the subject matter described herein is not limited to any particular number, type, or manner of providing graphical indicia of the viability of runways at an airport.

Figure 5:
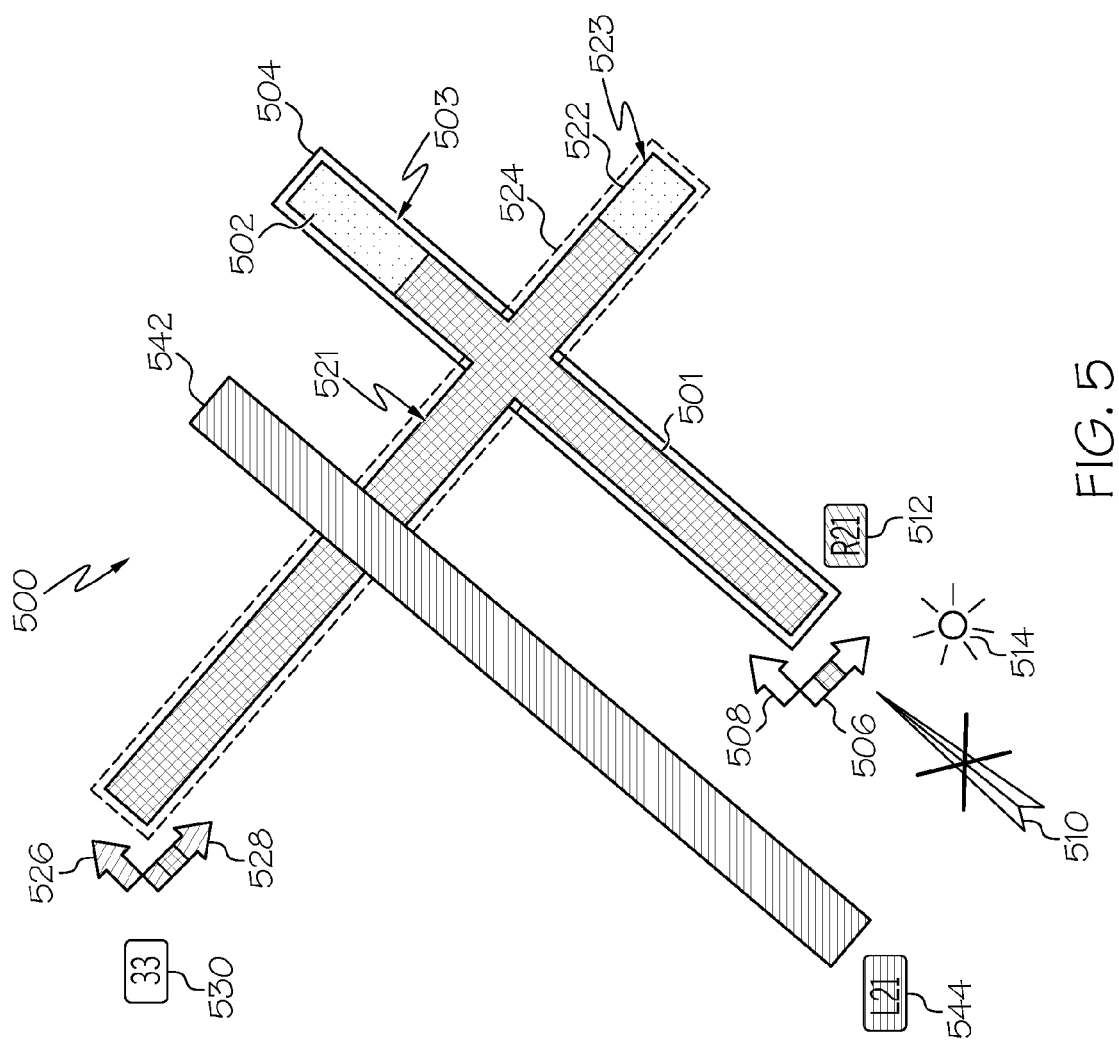
FIG. 5 depicts another exemplary embodiment of an airport map suitable for use in conjunction with the airport status display process of FIG. 2 for presentation on or overlying a navigational map display of FIGS. 3-4.

FIG. 5 depicts another exemplary embodiment of an airport map 500 suitable for presentation on a display device 104 (e.g., as airport map 420 overlying navigational map 300). Referring first to runway R21, the illustrated runway symbology 502 includes a first portion 501 rendered with a first visually distinguishable characteristic to indicate an estimated braking distance for the aircraft 102 with respect to runway R21, a second portion 503 rendered with a different visually distinguishable characteristic to indicate any remaining distance on runway R21, and outline symbology 504 (e.g., a contoured frame) indicating the full length of the runway is currently available. Thus, the graphical indicia 501, 503 used to render runway R21 in FIG. 5 and the associated available length symbology 504 indicate that there is sufficient distance (or available length) on runway R21 for landing the aircraft 102 on runway R21 under current conditions. The estimated braking distance for the aircraft 102 with respect to runway R21 is an example of a complex viability parameter for that particular runway at the selected airport that is calculated or otherwise determined based on one or more base status parameters associated with the aircraft 102 and/or the airport, such as, for example, one or more of the following: the current location and altitude of the aircraft 102, the current airspeed of the aircraft 102, the current heading of the aircraft 102, the current aircraft configuration status (e.g., engine status, flap configuration, landing gear configuration, and the like), the current amount of fuel remaining onboard the aircraft 102, the predicted weight of aircraft at time of landing, aircraft braking performance, the current meteorological conditions at the current location and altitude of the aircraft 102, the current meteorological conditions at the airport, the current surface conditions at the airport, and the current available runway length for the runway R21.

In the illustrated embodiment, the label symbology 512 associated with runway R21 is also rendered with a fill color or pattern to indicate the operational status of the runway, such as, for example, a gray background to indicate that runway R21 is limited by virtue of the instrument landing system (ILS) being turned off or otherwise not in operation and problems with the lighting system for the runway. Additionally, ILS status symbology 510 may be displayed or otherwise presented proximate to an approach end of the runway 502 to indicate a non-precision approach must be executed due to currently unavailable ILS, where the absence of the ILS symbology 510 indicates a functional and operational ILS. Similarly, a lighting system status symbol 514 may also be displayed or otherwise presented proximate to an approach end of the runway 502 to indicate problems with the runway lighting, where the absence of the lighting system symbology 514 indicates a functional and operational lighting system.

The airport map 500 also includes symbology 506, 508 proximate to an approach end of the runway that are representative of the crosswind and tailwind associated with runway R21, which may be calculated by the processing system 108 based on the current meteorological conditions at the airport and the heading of the runway. In one or more exemplary embodiments, the wind symbology 506, 508 is rendered with a length or size along with other visually distinguishable characteristics to indicate the magnitude of the winds, with an orientation corresponding to the direction of those wind components relative to the runway centerline. For example, crosswind symbology 506 rendered with three visually distinguishable segments may indicate a crosswind of 30 knots or more, whereas tailwind symbology 508 rendered with a shorter length with only a single segment may indicate a tailwind below 15 knots, while wind symbologies with two visually distinguishable segments may indicate a wind speed between 15 knots and 30 knots, and so on. Additionally, in one or more embodiments, one or more of the segments of the windspeed components 506, 508 are rendered using a visually distinguishable characteristic that indicates the surface conditions of the runway. For example, a first color for the windspeed component segments may indicate a dry or otherwise cleared and unimpacted runway surface, while other colors for the windspeed component segments may indicate a wet runway surface, ice or snow cover on the runway surface, or other debris or surface conditions.

For example, referring now to the runway symbology 522 for runway 33, the windspeed components 526, 528 rendered proximate the approach end of runway 33 include segments having a visually distinguishable characteristic that indicates a different surface condition for runway 33 relative to runway R21. For example, runway R21 may have been plowed, salted, or otherwise treated for ice and/or snow, while runway 33 has not yet been cleared or treated. That said, the filled portions 521, 523 of the runway symbology 522 in conjunction with the outline symbology 524 indicate to the pilot that there is still sufficient available runway length to satisfy the estimated stopping distance for the aircraft 102 on runway 33 given the current surface conditions and tailwinds. However, the outline symbology 524 is rendered with a visually distinguishable line type (e.g., dashing) to indicate that the runway 33 is currently inactive (e.g., due to the combination of strong tailwinds and surface conditions), and additionally, the label symbology 530 for runway 33 is rendered without any visually distinguishable characteristics to indicate the inactive status. Additionally, in the embodiment of FIG. 5, runway L21 is closed, and thus, its runway symbology 542 is rendered with graphical indicia or overlying symbology to indicate its closed status, as well as its associated textual label 544 being rendered with a visually distinguishable characteristic to indicate its closure.

Figure 6:
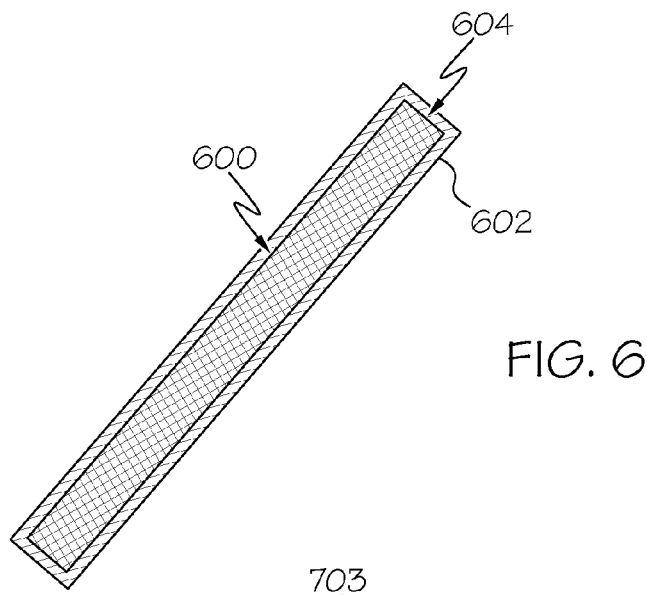
FIGS. 6-8 depict an exemplary graphical representations of a runway showing different indicia for different runway viability parameters suitable for use in conjunction with the airport status display process of FIG. 2 or the airport maps of FIGS. 4-5 in accordance with one or more embodiments.
Figure 7:
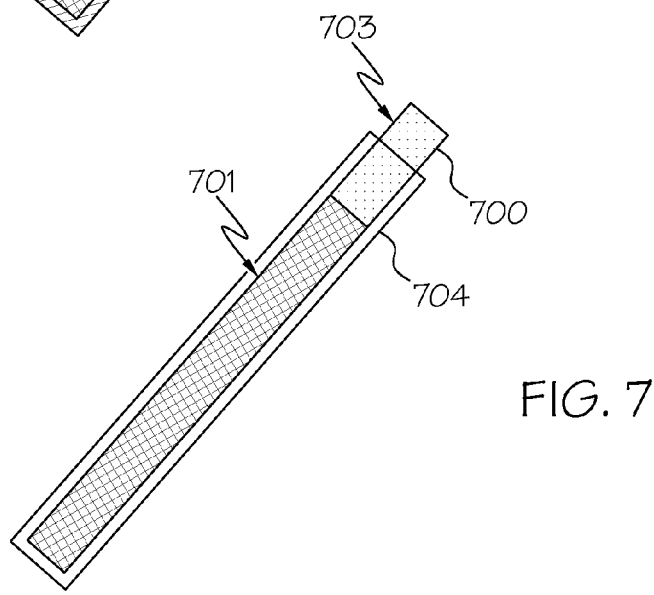
Figure 8:
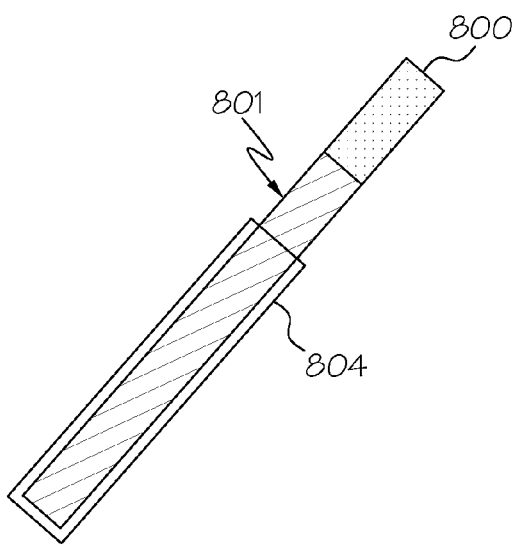

FIGS. 6-8 depict different exemplary embodiments of graphical indicia and symbology associated with runway symbology for purposes of indicating different viability parameters associated with the respective runway under different conditions. For example, turning first to FIG. 6, the runway symbology 600 includes a fill portion encompassing the entire length of the runway symbology 600, thereby indicating the calculated stopping distance is substantially equal to the length of the runway. Additionally, the available runway length symbology 602 circumscribes the runway symbology 600, thereby indicating the entire length of the runway is available for landing. However, the intermediate region 604 between the outer border of the runway symbology 600 and the available runway length symbology 602 is rendered using a visually distinguishable characteristic (e.g., hatching) to indicate that there are no viable taxiways for taxiing the aircraft 102 to/from the runway. In this regard, the processing system 108 may calculate or otherwise determine a taxiway viability parameter state based on the predicted or calculated landing weight of the aircraft 102 (e.g., which is determined based at least in part on current base status parameters), the wingspan of the aircraft, and the weight and wingspan restrictions associated with each taxiway that intersects the runway, which may be obtained or otherwise identified from an airport database or other data storage element 122, 124 coupled to the processing system 108.

For example, for each taxiway intersecting the runway within the available portion of the runway, the processing system 108 may compare both (1) the wingspan limit associated with that taxiway to the wingspan of the aircraft 102 and (2) the weight limit associated with that taxiway to the predicted landing weight of the aircraft 102, and if both comparisons are true (e.g., wingspan of the aircraft 102 is less than the wingspan limit for the taxiway and the predicted landing weight is less than the weight limit for the taxiway), the processing system 108 may set the taxiway viability parameter value associated with the runway to a viable state (e.g., 'true' or logic '1'). Conversely, if the comparison fails for each taxiway (e.g., the wingspan of the aircraft 102 is greater than the wingspan limit for the taxiway and/or the predicted landing weight is greater than the weight limit for the taxiway), after analyzing each taxiway intersecting the runway, the processing system 108 may set the taxiway viability parameter value associated with the runway to a nonviable state (e.g., 'false' or logic '0') and render the intermediate region 604 accordingly. It should be noted that any number of other characteristics may also influence the taxiway viability parameter state, such as, for example, whether the taxiway is capable of providing a taxi path to a particular terminal gate (e.g., a contracted terminal gate, a terminal gate capable of accommodating the current aircraft type, and/or the like).

FIG. 7 depicts an embodiment of a runway symbology 700 where the predicted stopping distance or braking distance for the aircraft 102 given the current status of the aircraft 102 and the current meteorological and surface conditions at the airport is less than the physical length of the runway (as indicated by filled portion 701 being less than the length of the runway symbology 700), however, the available length of the runway is less than the entire runway length, as indicated by the outline symbology 704. For example, due to maintenance, construction, or some other factors, a portion of the runway may be made unavailable, with the current status information for the airport being updated accordingly to reflect the current operational status (e.g., by the processing system 108 receiving updated airport status information via the communications system 112). However, the calculated braking distance (indicated by filled portion 701) is still less than the available runway length by at least some margin of remaining distance (e.g., indicated by the portion of the second filled portion 703 within the available runway length symbology 704), which indicates to the pilot that the runway may still be viable for landing but with reduced stopping distance margin than could otherwise be available on the runway. In this regard, the ratio of the calculated stopping distance to both the available and actual length of the runway corresponds to the length of the filled portion 701 relative to the respective runway length symbologies 700, 704. Thus, a pilot viewing a runway as depicted in FIG. 7 may quickly ascertain the relative viability of landing on a particular runway in terms of the predicted stopping distance, and based thereon choose a different runway (e.g., a runway with a greater stopping distance margin) at the current airport or revert back to the selecting a different airport (e.g., from list 410) until identifying a desired combination of runway and airport for diverting.

FIG. 8 depicts yet another embodiment of a runway symbology 800 where the predicted stopping distance or braking distance for the aircraft 102 calculated based on the current status of the aircraft 102 (e.g., aircraft landing weight and speed, aircraft configuration status and available braking options, and the like) and the current meteorological and surface conditions at the airport (e.g., the tailwind, estimated runway friction for the current surface conditions, and the like) is less than the physical length of the runway (as indicated by filled portion 801 being less than the length of the runway symbology 800), while also being greater than the available length of the runway indicated by the outline symbology 804. In such a scenario, the filled portion 801 of the runway symbology 800 corresponding to the calculated stopping distance may be rendered in a different visually distinguishable characteristic relative to the embodiments of FIGS. 6-7 (e.g., an amber color) to visually emphasize the lack of available runway length in conjunction with the available runway length symbology 804. Thus, a pilot viewing a runway as depicted in FIG. 8 may quickly ascertain the relative unavailability of that runway for purposes of landing, and based thereon search for a different runway at either the current airport or a different airport.

By virtue of the subject matter described herein, the pilot can quickly ascertain the relative viability of landing at the individual runways at a particular airport, and thereby proceed with selection of a desired combination of airport and runway for landing the aircraft with improved situational awareness and reduced mental workload. In particular, complex viability parameter values or states that are functions of various different pieces of information from different sources may be determined in real-time, so that the most up-to-date picture of the current operating situation is presented in a clear and concise manner, without requiring a pilot to manually gather and then parse the information. For example, as described above, an onboard processing system may obtain current status base parameters pertaining to the aircraft from onboard systems and obtain current status base parameters pertaining to the aircraft from one or more external sources via an onboard communications system (or alternatively, an onboard database or other data storage element that is periodically updated), and then based thereon, calculate various complex runway viability parameter values and states that are otherwise not readily available using onboard instrumentation. In this regard, the subject matter is dynamic and reflects changes to the status of the aircraft or the airport over time. It should be appreciated that the embodiments illustrated and described above represent a sampling of the potential runway viability parameters that may be graphically indicated, and practical embodiments may use various different graphical indicia or symbols to indicate any number or type of runway viability parameters, in any number of different combinations. Additionally, as noted above, the subject matter is not necessarily limited to aircraft, as alternative embodiments may calculate or otherwise determine different viability parameters for a different type of destination suitable for a particular vehicle, and use various different graphical indicia or symbols to indicate any number, type or combination of viability parameters to the vehicle operator.

Figure 9:
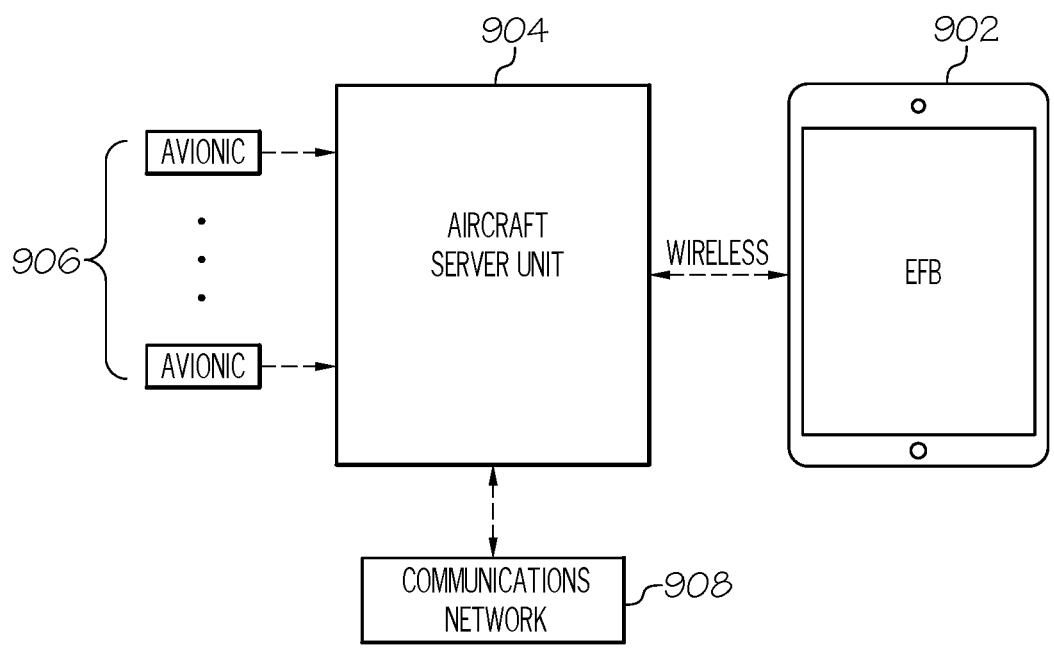
FIG. 9 depicts an exemplary embodiment of an electronic flight bag (EFB) system suitable for implementing the airport status display process of FIG. 2 in conjunction with the aircraft system of FIG. 1 in accordance with one or more embodiments.

FIG. 9 depicts an exemplary embodiment of an electronic flight bag (EFB) system 900 suitable for implementing the subject matter described herein. The EFB system includes an electronic device 902 (alternatively referred to as the EFB) that is communicatively coupled to a host device 904 that is communicatively coupled to the avionics systems 906 onboard an aircraft (e.g., avionics systems 112, 114, 116, 118, 120). The host device 904 generally represents a computer system configured support the airport status display process 200 described herein and provide corresponding indications of the stable descent strategy on the electronic device 902, and for purposes of explanation, but without limitation, the host device 904 is referred to herein as a server unit (or server). In this regard, the host server 904 includes at least a processing system (e.g., processing system 108) and/or other hardware computing resources along with one or more data storage elements (or memory) capable of storing instructions, that, when read and executed by the processing system, cause the host server 904 to generate or otherwise support the airport status display process 200. The host server 904 may also be coupled to a communications network 908, which may be utilized to receive data and/or information (e.g., meteorological information, or the like) in conjunction with the airport status display process 200 and/or to support communications with the electronic device 902.

In exemplary embodiments, the electronic device 902 is realized as a laptop or notebook computer, a tablet computer, or another suitable computing device configured to provide EFB-functionality, and accordingly, the electronic device 902 is alternatively referred to herein as an EFB. The EFB 902 includes at least a display device (e.g., display device 104) and a processing system (e.g., processing system 108 and/or display system 110), a data storage element (or memory) configured to support generating graphical representations pertaining to operation of the aircraft 102 as described above, such as, for example, a navigational map (e.g., map 300) or an airport map (e.g., maps 420, 500) pertaining to the operation of the aircraft.

In one or more embodiments, a pilot of the aircraft utilizes the EFB 902 to initiate the display process 200 described above, select or otherwise indicate airports for analysis, and then input or otherwise provide indication of the diversion airport the pilot would like to utilize. Thereafter, the EFB 902 may transmit or otherwise provide indication of the identified diversion airport to the server 904. The server 904 accesses the avionics systems 906 and/or the communications network 908 to receive or otherwise obtain the current position of the aircraft, the current amount of fuel remaining onboard the aircraft, the meteorological information for the region of interest encompassing the diversion airport along with the current aircraft position, and the like. Thereafter, the server 904 identifies a diversion route to the identified airport and provides indication of the diversion route and the corresponding descent and approach strategies to the EFB 902, which, in turn, generates or otherwise provides a graphical indication of the diversion route and its associated descent and approach strategies on the display of the EFB 902. Thus, the pilot may utilize the EFB 902 to assess or otherwise analyze the diversion scenario and operate the aircraft accordingly for landing at a desired runway at a desired diversion airport.

For the sake of brevity, conventional techniques related to graphics and image processing, avionics systems, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements directly connected to one another, additional intervening elements, devices, features, or components may be present in an embodiment of the depicted subject matter. In addition, certain terminology may also be used herein for the purpose of reference only, and thus are not intended to be limiting.

The foregoing detailed description is merely exemplary in nature and is not intended to limit the subject matter of the application and uses thereof. Furthermore, there is no intention to be bound by any theory presented in the preceding background, brief summary, or the detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A method of facilitating analysis of landing an aircraft at an airport, the method comprising:
    displaying, on a display device, a map of the airport, the map including runway symbology corresponding to a runway at the airport;
    determining a predicted stopping distance for the aircraft based at least in part on meteorological information associated with the airport; and
    rendering a filled portion of the runway symbology on the map, wherein a length of the filled portion of the runway symbology corresponds to a ratio of the predicted stopping distance to a length of the runway.

2. The method of claim 1, further comprising displaying symbology indicative of a second runway viability parameter on the map proximate the runway symbology.

3. The method of claim 2, wherein:
    the second runway viability parameter comprises a windspeed component determined based at least in part on current meteorological information associated with the airport; and
    displaying the symbology comprises displaying a windspeed symbol representative of the windspeed component proximate an approach end of the runway symbology.

4. The method of claim 1, further comprising displaying outline symbology encompassing at least a portion of the runway symbology.

5. The method of claim 4, further comprising rendering an intermediate region between the outline symbology and the runway symbology using a visually distinguishable characteristic indicative of a runway viability parameter.

6. The method of claim 1, wherein rendering the filled portion comprises rendering the filled portion using a visually distinguishable characteristic relative to a remaining portion of the runway symbology.

7. The method of claim 1, wherein determining the predicted stopping distance comprises determining the predicted stopping distance for the aircraft based at least in part on current meteorological information associated with the airport and a predicted landing weight for the aircraft.

8. The method of claim 7, further comprising identifying the visually distinguishable characteristic based on the current meteorological information associated with the airport.

9. The method of claim 7, further comprising determining the predicted landing weight of the aircraft based at least in part on a current amount of fuel remaining onboard the aircraft.

10. The method of claim 7, further comprising displaying available runway length symbology encompassing at least a second portion of the runway symbology, wherein a ratio of an available runway length to the length of the runway corresponds to a second length of the second portion of the runway symbology encompassed by the available runway length symbology.

11. The method of claim 10, further comprising identifying the visually distinguishable characteristic based on the stopping distance relative to the available runway length.

12. The method of claim 1, further comprising determining a predicted landing weight for the aircraft based at least in part on current status information associated with the aircraft and current meteorological information associated with the airport, wherein the predicted stopping distance is influenced by the predicted landing weight.

13. The method of claim 1, further comprising obtaining, by a processing system onboard the aircraft via another system onboard the aircraft, a current status base parameter value associated with the aircraft, wherein:
    determining the predicted stopping distance comprises calculating, by the processing system, a value for a complex runway viability parameter based at least in part on the current status base parameter value; and
    a characteristic of the filled portion is influenced by the value for the complex runway viability parameter.

14. A computer-readable medium having computer-executable instructions stored thereon that, when executed by a processing system coupled to the display device onboard the aircraft, cause the processing system to perform the method of claim 1.

15. A system comprising:
    a display device having an airport map including runway symbology corresponding to a runway at an airport displayed thereon; and
    a processing system coupled to the display device to:
        determine a predicted stopping distance for an aircraft based at least in part on meteorological information associated with the airport; and
        render a filled portion of the runway symbology on the map, wherein a length of the filled portion of the runway symbology corresponds to a ratio of the predicted stopping distance to a length of the runway.

16. The system of claim 15, further comprising a meteorological system coupled to the processing system to provide the meteorological information corresponding to the airport.

17. The system of claim 16, further comprising an onboard system coupled to the processing system to provide current status information for the vehicle, wherein the processing system determines the predicted stopping distance based at least in part on the meteorological information and the current status information.

18. The system of claim 15, further comprising:
an avionics system coupled to the processing system to provide one or more current status base parameter values to the processing system; and
a communications system coupled to the processing system to provide current meteorological information for the airport, wherein:
the processing system is configurable to:
determine the predicted stopping distance based at least in part on the one or more current status base parameter values and the current meteorological information.

19. A method of facilitating analysis of an airport, the method comprising:
displaying, on a display device onboard an aircraft, a map of an airport, the map including runway symbology corresponding to a runway at the airport;
obtaining, by a processing system onboard the aircraft, current information associated with one or more of the vehicle and the airport from one or more onboard systems coupled to the processing system;
calculating, by the processing system, a predicted stopping distance for the aircraft at the airport based at least in part on the current information; and
rendering, by the processing system, a filled portion of the runway symbology using a visually distinguishable characteristic, wherein a length of the filled portion of the runway symbology corresponds to a ratio of the predicted stopping distance to a length of the runway.

20. The method of claim 19, wherein:
obtaining the current information comprises obtaining one or more base parameter values quantifying a current status;
calculating the viability parameter comprises calculating a complex parameter value based on the one or more base parameter values; and
the filled portion is influenced by the complex parameter value.

* * * * *